US008160967B2

(12) United States Patent
Winzenried et al.

(10) Patent No.: US 8,160,967 B2
(45) Date of Patent: Apr. 17, 2012

(54) AUTHORIZATION CODE RECOVERING METHOD

(75) Inventors: Oliver Winzenried, Karlsruhe (DE); Marcellus Buchheit, Karlsruhe (DE)

(73) Assignee: WIBU-Systems AG, Karlsruhe (DE)

( * ) Notice: Subject to any disclaimer, the term of this patent is extended or adjusted under 35 U.S.C. 154(b) by 24 days.

(21) Appl. No.: 10/584,788

(22) PCT Filed: Dec. 30, 2004

(86) PCT No.: PCT/EP2004/014837
§ 371 (c)(1),
(2), (4) Date: Jun. 28, 2006

(87) PCT Pub. No.: WO2005/064432
PCT Pub. Date: Jul. 14, 2005

(65) Prior Publication Data
US 2007/0094144 A1 Apr. 26, 2007

(30) Foreign Application Priority Data
Dec. 30, 2003 (EP) ..................................... 03029968

(51) Int. Cl.
*G06Q 99/00* (2006.01)
(52) U.S. Cl. ................. 705/71; 705/55; 726/26
(58) Field of Classification Search ............... 705/50–79
See application file for complete search history.

(56) References Cited

U.S. PATENT DOCUMENTS

| 5,768,389 | A * | 6/1998 | Ishii ................................ 380/30 |
| 5,999,629 | A * | 12/1999 | Heer et al. ....................... 705/51 |
| 6,226,618 | B1 * | 5/2001 | Downs et al. ..................... 705/1 |
| 6,266,421 | B1 * | 7/2001 | Domyo et al. ................. 380/286 |
| 6,278,782 | B1 * | 8/2001 | Ober et al. ..................... 380/264 |
| 6,308,256 | B1 * | 10/2001 | Folmsbee ....................... 712/209 |
| 6,335,972 | B1 * | 1/2002 | Chandersekaran et al. .. 380/286 |
| 6,772,340 | B1 * | 8/2004 | Peinado et al. ................. 705/56 |
| 6,792,113 | B1 * | 9/2004 | Ansell et al. .................... 705/57 |
| 7,032,240 | B1 * | 4/2006 | Cronce et al. ................... 705/51 |
| 7,062,468 | B2 * | 6/2006 | Hillegass et al. ............... 705/59 |
| 7,143,297 | B2 * | 11/2006 | Buchheit et al. .............. 713/193 |

(Continued)

FOREIGN PATENT DOCUMENTS

CN 1361481 7/2002

(Continued)

OTHER PUBLICATIONS

Derfler, "How Networks Work", Bestseller Edition, 1996, Ziff-Davis Press, Emeryville, CA, all pages.*

(Continued)

*Primary Examiner* — Jacob C. Coppola
(74) *Attorney, Agent, or Firm* — Marc A. Hubbard; Gardere Wynne Sewell LLP

(57) ABSTRACT

A method for recovering an authorization code which is assigned to a licensee by a licensor and is stored in an access-protected data processing device that is connected to a computer of said licensee via an interface. A backup file which is part of the authorization code and contains the license parameters is stored on the licensee's computer. The license parameters associated with the licensor are read out of the backup file, the license parameters are sent to the respective licensor, authorization codes corresponding to the received license parameters are recovered at the level of the licensor, the recovered authorization code is then returned to the licensee's computer, and the recovered authorization codes are stored in the data processing device connected to the licensee's computer.

17 Claims, 1 Drawing Sheet

U.S. PATENT DOCUMENTS

| | | | |
|---|---|---|---|
| 7,483,860 B2* | 1/2009 | Cronce et al. | 705/50 |
| 2002/0019814 A1* | 2/2002 | Ganesan | 705/59 |
| 2002/0031222 A1* | 3/2002 | Buchheit et al. | 380/201 |
| 2002/0091930 A1* | 7/2002 | Kohl et al. | 713/182 |
| 2002/0131594 A1* | 9/2002 | Hori et al. | 380/201 |
| 2002/0138724 A1* | 9/2002 | Aull | 713/156 |
| 2003/0028786 A1 | 2/2003 | Mustafa | |
| 2003/0074569 A1* | 4/2003 | Yamauchi et al. | 713/189 |
| 2003/0163428 A1* | 8/2003 | Schneck et al. | 705/51 |
| 2003/0172035 A1* | 9/2003 | Cronce et al. | 705/59 |
| 2004/0042620 A1* | 3/2004 | Andrews et al. | 380/286 |
| 2004/0210821 A1 | 10/2004 | Kasser | |
| 2004/0243610 A1 | 12/2004 | Ishiguro et al. | |
| 2005/0027997 A1* | 2/2005 | Ueno et al. | 713/193 |
| 2005/0132201 A1* | 6/2005 | Pitman et al. | 713/176 |
| 2005/0144019 A1* | 6/2005 | Murakami et al. | 705/1 |
| 2006/0136735 A1* | 6/2006 | Plotkin et al. | 713/182 |
| 2006/0174349 A1* | 8/2006 | Cronce et al. | 726/26 |
| 2008/0319909 A1* | 12/2008 | Perkins et al. | 705/50 |

FOREIGN PATENT DOCUMENTS

| | | |
|---|---|---|
| JP | 2001274746 | 3/2003 |
| WO | WO 01/18807 A2 | 3/2001 |

OTHER PUBLICATIONS

White, "How Computers Work", Millennium Edition, 1999, Que Corporation, Indianapolis, IN, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

* cited by examiner

AUTHORIZATION CODE RECOVERING METHOD

BACKGROUND OF THE INVENTION

The present invention relates to a method for recovering an authorization code, which was assigned to a licensee by a licensor, with the authorization code being stored in an access-protected data-processing device, which is connected to a computer of the licensor via an interface.

Application programs, software, and other electronic documents are often protected from unauthorized access. To use this electronic data and these programs, the user needs a license from the licensor. The licensee receives an authorization code, which enables him to exercise his license, from the licensor.

In the simplest case, the authorization code is sequence of alphanumeric characters, which is input manually by the licensee during the first use of the program or for each opening of a document. However, one disadvantage of this method is that the licensee can pass on the authorization code to unauthorized third parties, so that it can lead to undesired duplication of the authorization code and thus to misuse of the license.

Alternatively, the authorization code can be stored directly by the licensor in a data-processing device known as a dongle. The authorization code cannot be removed from the dongle; thus it cannot be duplicated. The execution of a computer program protected in this way is possible only if the dongle is connected to an interface of the computer on which the application program is to be executed. Because the dongle is created by the licensor, a separate dongle, which occupies the interface on the computer, is necessary for each application program. If the dongle is lost or destroyed, the licensor must be contacted in order to create a new dongle with the corresponding authorization code and send it to the licensee.

Electronic data-processing devices on which several authorization codes are stored for application programs or digital documents are also known. These devices are also connected to the interface of a computer. One example for such a data-processing device is the codemeter stick made by Wibu Systems AG. This is a mobile license stick, which is connected, for example, to the USB interface of a computer. The principle and operation of such a licensing device are described in EP 1 184 771 B1.

A licensee purchases an "empty" data-processing device. The licenses or "digital rights" can be written onto the data-processing device only by the originators or authorized licensors. The owner of the device can neither create nor write licenses or authorization codes of a licensor into the device by himself independently.

On the data-processing device, "digital rights" from several independent licensors can be stored for several different and independent products. These can also be, in addition to application programs and computer software, documents, music files, or films. The licenses can be of various types, for example, unrestricted in time, restricted in time, or restricted in use, so-called pay-per-use licenses or the like. As soon as the stick is inserted into the computer, the corresponding programs can query the authorization codes of the licenses and enable use or access.

The greater the number of authorization codes and digital rights stored in the device, the greater the value of the device. If a device in which many licenses or authorization codes for licenses are stored is lost or damaged, the restoration of the authorization codes is very labor-intensive. For each individual license, the corresponding licensor must be contacted; proof of the authorization and the purchase of the licenses must be provided and sent to the licensor. This is a complicated and long procedure. Often, it is not possible recover all of the authorization codes. For use-dependent licenses, which decrease with the frequency of use, the licensor is usually not ready to restore the license completely.

SUMMARY AND DESCRIPTION OF THE INVENTION

Thus, the task of the present invention is to restore authorization codes stored securely in a device to be connected to the computer simply and quickly in the case of a lost or defective device.

The method according to the invention for restoring an authorization code that was assigned to a licensee by a licensor, with the authorization code being stored in an access-protected data-processing device connected to a computer of the licensee via an interface, accesses a security file stored on the computer of the licensee. The security file belonging to the authorization code contains the license parameters for the corresponding authorization code. According to the method according to the invention, the following steps are performed:

Reading the parameters belonging to the licensor from the security file stored on the computer. Establishing a remote data connection between the computer of the licensee and a computer of the licensor and sending the read license parameters to the computer of the licensor. Furthermore, then the authorization code corresponding to the received license parameters are restored by the licensor. The licensor sends the restored authorization code back to the computer of the licensee. In the last step, the restored authorization code is stored in the data-processing device connected to the computer of the licensee.

The authorization code is an access code or an access authorization in order to be able to execute a program or access digital data. The digital data includes, for example, films, music files, or other protected documents. Thus, the authorization code represents a "digital right" to be able to use files licensed by the originator in the scope of an existing license. In addition, the authorization code also includes all of the license parameters necessary for restoring the authorization code. Only with the appropriate authorization code protected on a data-processing device is it possible to store the license parameters in a security file on the computer.

In order to restore the authorization code stored on the device, a security file stored on the computer is needed. Thus, there is a clear separation between the memory location of the security file and the location, at which the authorization code is stored. In the case of a lost or destroyed data-processing device, the security file remains available on the computer. The security file also includes, in addition to the license parameters, other information that enables it to contact the licensor. The license parameters include all of the data required for restoring the authorization code. In addition, additional information on the licensee can also be stored in the security file. Because the security file does not contain the authorization code itself, no special protection of the security file is necessary. It can be copied or duplicated.

The creation or updating of the security file can be initiated by a licensed application or executed manually or automatically periodically. As a standard, it is created automatically every twenty-four hours. Thus, a very up-to-date security file is always available. This is especially important for restoring authorization codes for time-dependent or use-dependent licenses. An existing security file is updated at the latest when new licenses or authorization codes are requested or license parameters are updated by the licensor.

For a lost or damaged data-processing device, a new data-processing device is obtained by the licensee and connected to the interface of the computer. However, the new data-processing device is "empty" and contains absolutely no license data. Thus, the original authorization code must be restored to this new device. For restoring the lost authorization code, the license parameters required for restoring the authorization code are sent to the licensor. The licensor evaluates the received license parameters. On the basis of the "old" license parameters, the licensor restores the authorization code or generates a "new" authorization code. The new or restored authorization code then corresponds to the authorization code protected on the original device. The licensor remains the only authorized party for generating the authorization code. Thus, he has the control over every issued and generated authorization code for the licenses granted by him; thus it remains his decision whether he restores the authorization code or not.

The restored authorization code is sent to the licensee, for example, via the Internet. Here, the code can be encrypted for transmission. Transmission in other ways, for example, by writing onto a diskette or CD and mailing the diskette or CD, is also conceivable.

However, the received authorization code cannot be stored in the computer of the licensee itself, but instead only in the connected data-processing device. Thus, the computer establishes only a connection, for example, an Internet connection, and passes on the authorization code to the data-processing device. If a new data-processing device is not connected to the interface of the computer, then the entire method for restoring the authorization code cannot be performed and the Internet connection between the computer of the licensee and the computer of the licensor is broken.

The method is also suitable for transmitting an authorization code from a first device to a second device. For this purpose, a delete command is also sent to the first device in order to delete the authorization code to be transferred from the device. Otherwise, the authorization code would be duplicated. However, this is not desired by the licensor.

According to the invention, the authorization code is preferably stored in a device-specific format in the data-processing device. Thus, the code can be stored only on the device, but not on the connected computer establishing the connection to the licensor. To the computer, the device-specific format in which the authorization code is provided is unreadable. Therefore, it can also neither be copied nor can it be manipulated or modified by a user or licensee. Thus, the storage of the authorization code is very secure against unauthorized access.

Advantageously, the license parameters in the security file are present at least partially in encrypted form and are stamped with the date and time of creation. Sensitive license parameters can be protected against access by third parties through encryption. In particular, confidential data, such as personal data of the licensee or data containing the authorization for the receipt or possession of an authorization code, is encrypted. However, the entire security file can also be encrypted. The electronic signature ensures that the license parameters cannot be changed. In the case of manipulation of the license parameters or the security file, the signature and the data no longer match. Thus, misuse of the security file is reliably ruled out, as is manipulation of the license parameters. This is especially important because the security file can be copied.

In addition, the license parameters belonging to an authorization code can be encrypted by the licensor and transmitted signed to the licensee. Then the license parameters also cannot be manipulated by unauthorized third parties during the exchange between the licensee and the licensor.

In addition, the security file is stamped with a time signal. The stamping is realized with the last certified time of the data-processing device. During production, the data-processing device receives a certified time. When the data-processing device is connected to the interface of a computer, this time is always counted forwards. Thus, it corresponds to neither the current time nor the system time of the computer. However, it is advantageous that this certified time cannot be manipulated. Furthermore, this time can be updated with time certificates delivered by time servers via the Internet.

Especially preferred is an improvement of the method in which the following additional steps are executed: receiving the license parameters at the licensor and then evaluating the license parameters. On the basis of the evaluated parameters, in the next step it is decided whether the requested authorization code should be restored and sent back to the licensee.

Thus, the licensor decides freely and according to his own business whether an authorization code shall be restored. Especially for repeated losses or repeated requests for restoring the authorization code, the licensor can deny the restoration. If the loss of one or more devices at periods very close in time is reported by a licensee, the licensor can delay restoration dependent on further testing or can completely refuse restoration.

The licensor can also decide in which way the restoration is to be performed depending on the license issued to the licensee. This is especially important when the license is a time-restricted license, a use-restricted license, so-called pay-per-use license, or some other special license. Only the licensor decides whether the authorization code is restored identically or in a modified form. For so-called pay-per-use license models, in which the digital rights contain so-called units of use, similar to a charge card, the licensor can decide to restore a percentage of its value, depending on how old the security file of the licensee is.

Preferably, the security file that had been assigned to the owner of the device contains certified time information. The security file then obtains a digital stamp with time information in order to rule out manipulation of the time of the creation of the security file.

Advantageously, the additional steps can also be performed: sending time information stored in the security file to the licensor, evaluating the time information by the licensor and generating an authorization code corresponding to the time information.

The time information contained in the security file can provide the time of the creation of the security file. At the time at which the security file was created, the device reported as lost or defective with the included authorization code was still functional and connected to the computer. For time-dependent licenses, the authorization code can now be restored as a function of the time information. Here, deviating from the originally provided license, a modified authorization code can be generated and sent to the licensee. If the time limit of the time-restricted license has expired in the interim, the restoration of the authorization code is refused. For use-dependent licenses, only a percentage of the use allotment can be made available by the licensor in the restored authorization code as a function of the contained time information.

Certified time information is encrypted and transmitted to the data-processing device from the licensor. This can be performed when the licensee establishes a connection to the licensor. However, the certified time information can also be requested from a special time server as soon as the computer to which the data-processing device is connected has established a connection to the Internet.

It is especially advantageous when several authorization codes for licenses of several licensors are stored on the data-processing device. The greater the number of authorization codes stored on the data-processing device, the higher the value that the data-processing device represents. Thus, the restoration of lost or damaged authorization codes is especially important. The larger the number of authorization codes and different licensors, the more complicated is the creation of authorization codes in the case of a lost or destroyed data-processing device. In this case, for each license and for each licensor, a separate set of license parameters is stored in the security file.

Preferably, a connection to all licensors is established in order to allow the corresponding authorization codes to be restored. The licensors are stored in the security file. Each licensor receives only the data set of license parameters that are necessary for creating the authorization code of the license issued by him. He receives absolutely no information on other licenses, other authorization codes, or other licensors. Thus, information on other programs, data, music files, or films used by the same licensee remains in the private sphere of the licensee. Because the individual licensor receives only his license parameters from the security file, he can also restore only his licenses. This represents an additional security aspect in the restoration of authorization codes.

For restoring all authorization codes, the individual licensors stored in the security file are contacted individually and one after the other in order to request the authorization codes for the issued licenses. The method according to the invention is executed several times. The licensee must provide neither the data nor the addresses of the individual licensors. He does not have to know exactly whether and which type of licenses he possesses. Also, the licensee does not have to know when and where these licenses were purchased.

In the method according to the invention, in an especially preferred way the following additional steps are performed: establishing a remote data connection between the computer of the licensee and a central management computer, sending the security file to the management computer, and establishing a data connection between the computer of the licensor and the central management server.

The entire security file is sent to the central management computer during the process of restoring one or more authorization codes. The management server then reads the license parameters and the licensor from the security file and establishes the connection between the licensor or licensors and the management server. The management server manages the entire restoration of the authorization code or codes. Especially if there were many authorization codes from different licensors on the lost data-processing device, the use of the management server enables a quick and convenient restoration of all of the authorization codes. The management server can contact the individual licensors optionally one after the other and request the restoration of the authorization codes belonging to the licenses. After receiving the authorization code from the licensors, it can pass on the authorization codes to the licensee.

Preferably, in another step a remote data connection to the computer of the licensee and the computer of the licensor is established. If authorization codes from several licensors are stored on the data-processing device, all of the licensors stored in the security file are contacted and a connection to them is created. The return of the restored authorization codes can take place directly from the licensor to the licensee. The management server no longer must be connected in-between. In this way, first, the management server is relieved of administrative tasks, and, second, the restoration process can be significantly accelerated.

Furthermore, an improved method, in which the security file contains an unmodifiable serial number of the data-processing device, is especially preferred. If a security file is written, simultaneously the internal serial number of the data-processing device is also stored in the security file. The serial number is here preferably stored in a non-manipulatable format.

Preferably, the following additional steps are also executed: the serial number is read from the security file and sent to a management server. The serial number received by the management server is then stored in a block list in the management server. With each execution of the restoration of an authorization code, the serial number of the original data-processing device on which the authorization codes were stored is transmitted to the management server. The original data-processing device is thus reported as defective, lost, or stolen and registered in the block list. In this way, a list is created with all of the data-processing devices, the authorization codes of which were restored. Thus, unauthorized continued use of a lost or defective device can be prevented. Misuse of the restoration process as a duplicating process for authorization codes is thus ruled out.

If an Internet connection is established by the licensee's computer, to which a data-processing device with an authorization code is connected, then a signal can be sent to the management server. Also, if a certified time signal is to be queried from the management server or a time server, for example, in order to update the time information in the security file, the Internet connection to the computer of the licensee is recognized. The data-processing device then sends its serial number to the management server via the computer of the licensee. The management server tests the received serial number with the block list managed by it for defective or lost devices. If the received serial number of the data-processing device has already been stored in this number list, then a block notice is stored on the data-processing device in the form of a flag, which blocks the device and the retrieval of the protected authorization code. The data-processing device can then no longer be used. In this way, misuse of the restoration method is prevented. Duplication of the authorization code with the aid of the restoration process is thus stopped.

Alternatively, the licensor can also store the serial number of a data-processing device reported as lost or stolen in a number list. The licensor also sends the serial number of the device reported as stolen or defective to a management server that manages a list with all of the devices reported stolen. The management server checks whether the transmitted serial number originates from an authorized licensor. If this is the case, the serial number is recorded in the list. The database managed by the management server with the blocked serial numbers can be queried by every authorized licensors and certified time servers.

If a licensor receives a request to restore an authorization code, he first checks the transmitted serial number. For this purpose, he queries the database of blocked serial numbers of the management server. If the serial number is not contained in the database, the restoration process of the authorization code continues.

If the transmitted serial number is contained as a blocked number in the list, then a block signal is sent to the corresponding data-processing device. The data-processing device is then blocked and can no longer be used; the authorization codes stored on it can no longer be used. Any type of decryption or authentication is thus prevented.

BRIEF DESCRIPTION OF THE DRAWING

A special embodiment of the invention is explained in more detail with reference to the following figures. Shown are.

DETAILED DESCRIPTION OF A PREFERRED EMBODIMENT

Figure 1:
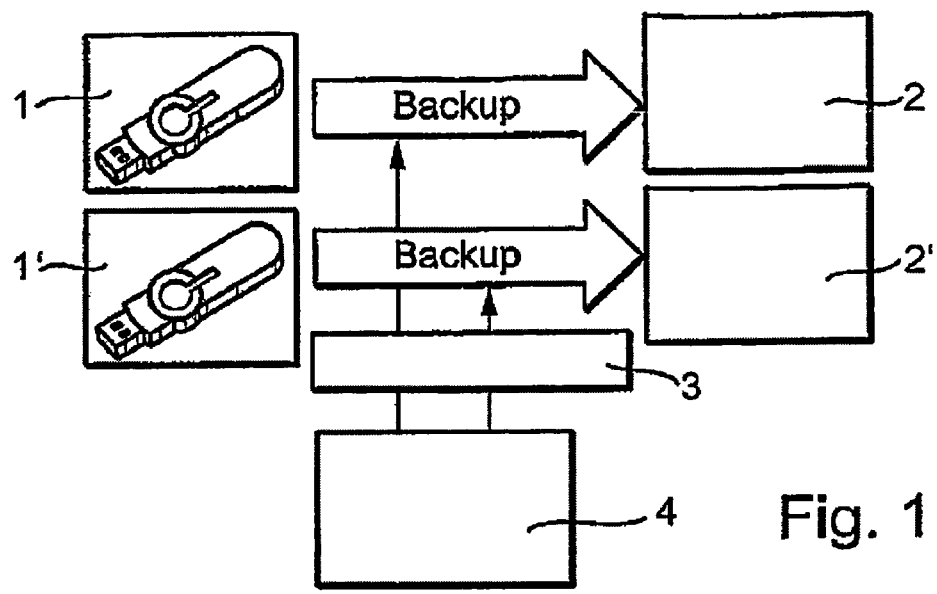
FIG. 1, the security structure on the side of the licensee for two data-processing devices.

For two data-processing devices 1, 1' in FIG. 1, a security file 2, 2' is assigned to each. For this purpose, the creation of a security file is initiated by an application program, a so-called back-up manager 3. The back-up manager 3 creates the security files 2, 2' as a function of parameters in a security control file 4.

Figure 2:
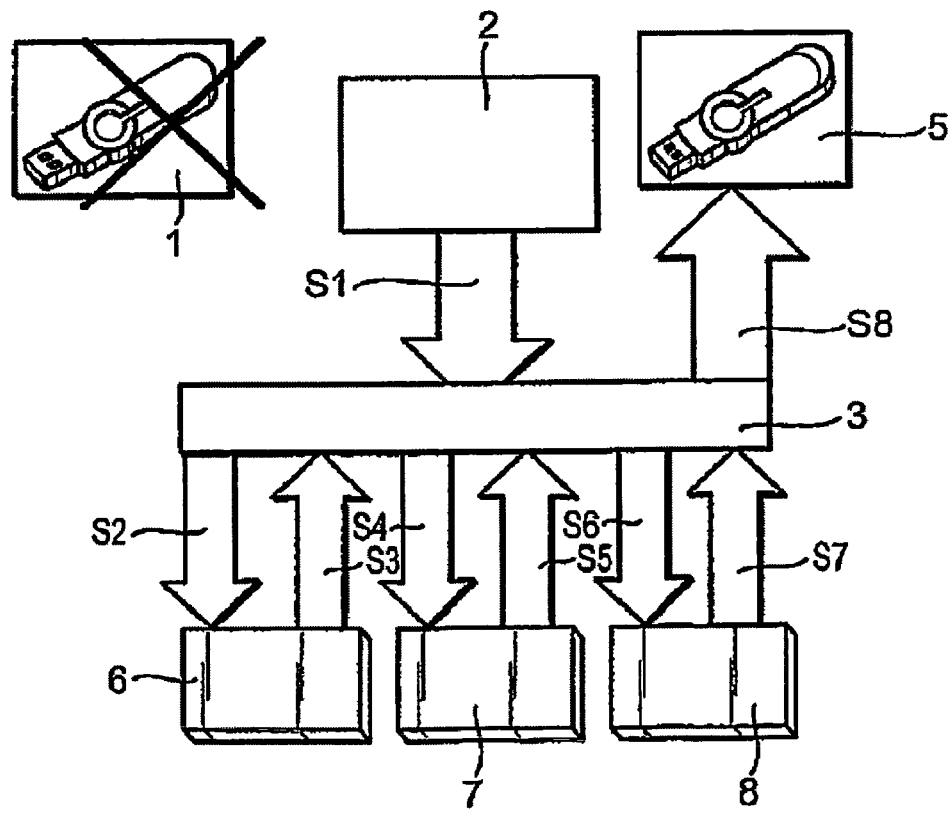
FIG. 2, the process sequence for requesting and storing restored authorization codes on a new data-processing device.

FIG. 2 shows the process for storing the restored authorization codes in a new data-processing device 5. If the data-processing device 1 is lost or defective, the security file 2 is read by the back-up manager 3. All of the license parameters contained in this file are evaluated by the back-up manager 3 in a first step S1.

In the second step S2, the license parameters belonging to the first licensor 6 are transmitted to the licensor 6. The licensor 6 generates an authorization code corresponding to the authorization code stored in the data-processing device 1 on the basis of the received license parameters. The restored authorization code is then transmitted in a third step S3 to the back-up manager 3.

In the fourth step S4, a remote data connection to the licensor 7 is established and the corresponding license parameters are transmitted to it. The licensor 7 restores the authorization codes corresponding to the received license parameters and returns them in step S5 to the back-up manager 3. In the subsequent steps S6 and S7, this method is repeated for the licensor 8.

The back-up manager 3 passes on the authorization codes received from the licensors 6, 7, 8 in another step S8 to the new data-processing device 5 and stores these codes there. The data-processing device 5 now contains all of the authorization codes that were stored in the defective data-processing device 1. Here, the restoration of the authorization codes that were stored in the security file 2 was requested from all of the licensors 6, 7, and 8.

LIST OF REFERENCE SYMBOLS

1, 1' Data-processing device
2, 2' Security file
3 Back-up manager
4 Security control file
5 Data-processing device
6, 7, 8 Licensor

The invention claimed is:

1. A method for restoring authorization codes assigned to a licensee by a licensor for a dongle, said method comprising:
    storing on a first computer to which a first dongle is connected via an interface parameters associated with each of a plurality of authorization codes stored on the first dongle, but not storing on the first computer the authorization codes, the plurality of authorization codes being associated with at least two different licensors, the first computer storing with the parameters information for enabling contact with each of the at least two different licensors;
    sending to a central management computer the parameters for each of the plurality of authorization codes and the information for enabling contact with the at least two different licensors by the central management computer, the central management computer being programmed for using the information enabling contact with the at least two different licensors to send parameters associated with a first licensor of the at least two licensors only to a second computer associated with the first licensor and not sending to the second computer parameters associated with any of the other of the at least two licensors;
    after sending the parameters, receiving a restored authorization code at the first computer in a format that can be interpreted only by the dongle and not by the first computer; and
    storing the restored authorization code in a second dongle connected to the first computer.

2. The method according to claim 1, wherein the parameters are signed with time information for protection and are stored at least partially in encrypted form.

3. The method according to claim 1, further comprising:
    receiving the parameters at the second computer;
    evaluating the parameters; and
    deciding with the second computer whether or not to return to the first computer the restored authorization code.

4. The method according to claim 2, wherein the parameters include time information, the method further comprising:
    communicating time information from the first computer to the second computer;
    evaluating the time information at the second computer; and
    generating the restored authorization code based on the time information.

5. The method according to claim 1, further comprising:
    establishing a remote data connection between the first computer and the second computer for communicating the restored authorization code from the second computer to the first computer.

6. The method according to claim 1, wherein the parameters are stored in a file that contains an unmodifiable serial number of the dongle and said method further comprising:
    reading the serial number from the file;
    sending the serial number to the central management computer; and
    storing the serial number in a block list at the central management computer.

7. The method according to claim 1, wherein the authorization code is storable only on the access-protected data processing device.

8. Computer readable media, excluding signals, for storing first instructions that, when read by a first computer, cause the first computer to execute a backup process and for storing second instructions that, when read by a central management computer, cause the central management computer to perform a process for restoring authorization codes assigned to a licensee by licensors to a dongle,
    wherein the backup process comprises:
        reading parameters from a first dongle, which is connected via an interface to a first computer used by a licensee and stores a plurality of original authorization codes from different ones of a plurality of licensors, each of the parameters being associated with one of the plurality of authorization codes and one of the plurality of licensors;

storing on the first computer the parameters read from a first dongle;

upon the dongle becoming lost or defective, sending the parameters to a central management computer;

after sending the license parameters, receiving from the first licensor a restored authorization code at the first computer in a format that can be interpreted only by a replacement dongle and not by the first computer; and storing the restored authorization code on a replacement dongle connected to the first computer; and wherein the process for restoring comprises:
receiving at the central management computer the parameters read from the first dongle, and sending those parameters of the parameters read from the first dongle that are associated with authorization codes of a first of the at least two licensors only to a second computer associated with the first licensor and not sending to the second computer any of the parameters read from the first dongle associated with authorization codes of any of the other of the at least two licensors.

9. The computer readable media of claim 8, wherein the original authorization code is not stored on the first computer.

10. The computer readable media of claim 8, wherein the parameters are signed with time information and are stored at least partially in encrypted form in the file.

11. The computer readable media of claim 8, wherein the parameters are stored in an encrypted form.

12. The computer readable media of claim 8, wherein the parameters are associated with first dongle and the original authorization codes stored by the first dongle.

13. The computer readable media of claim 8, wherein the process for restoring further comprises:
receiving at the second computer parameters from the central management computer;
evaluating the parameters;
deciding with the second computer whether or not to restore an authorization code based on the evaluation of the parameters; and
generating the restored authorization code based on the parameters and returning to the first computer the restored authorization code if it is decided to restore an authorization code, and otherwise not returning an authorization code.

14. The computer readable media of claim 8, wherein the parameters include time information; and wherein the restored authorization code is generated based on the time information.

15. The computer readable media of claim 8, wherein the first process further comprises storing on the first computer an unmodifiable serial number of the first dongle, sending the unmodifiable serial number from the first computer to the central management computer, and storing the unmodifiable serial number in a block list at the central management computer.

16. Apparatus for restoring authorization codes to dongles, the apparatus comprising:
a first computer programmed for storing parameters associated with each of the plurality of authorization codes stored on a first dongle attached to the first computer and assigned to a licensee by a plurality of licensors, and for storing information for enabling contact with each of the plurality of licensors; the first computer being further programmed to send the parameters and the information for enabling contacting each of the plurality of licensors to a central management computer in order to restore authorization codes, receiving restored authorization codes in a format that cannot be interpreted by the first computer and then storing the restored authorization codes in a second dongle connected to the first computer; and a central management computer programmed for sending, in response to receiving the parameters and the information for enabling contact with the licensors, the parameters associated with a first licensor of the plurality of licensors only to a second computer associated with the first licensor in order to restore authorization codes associated with the first licensor and assigned to the licensee, and not sending to the second computer parameters associated with any of the other licensors.

17. The apparatus of claim 16, wherein the first computer is further programmed for storing on the first computer an unmodifiable serial number of the first dongle, and sending the unmodifiable serial number from the first computer to the central management computer with the parameters; and wherein the central management computer is further programmed for storing, in response to receiving the unmodifiable serial number, the unmodifiable serial number in a block list at the central management computer.

* * * * *